Figure 1:
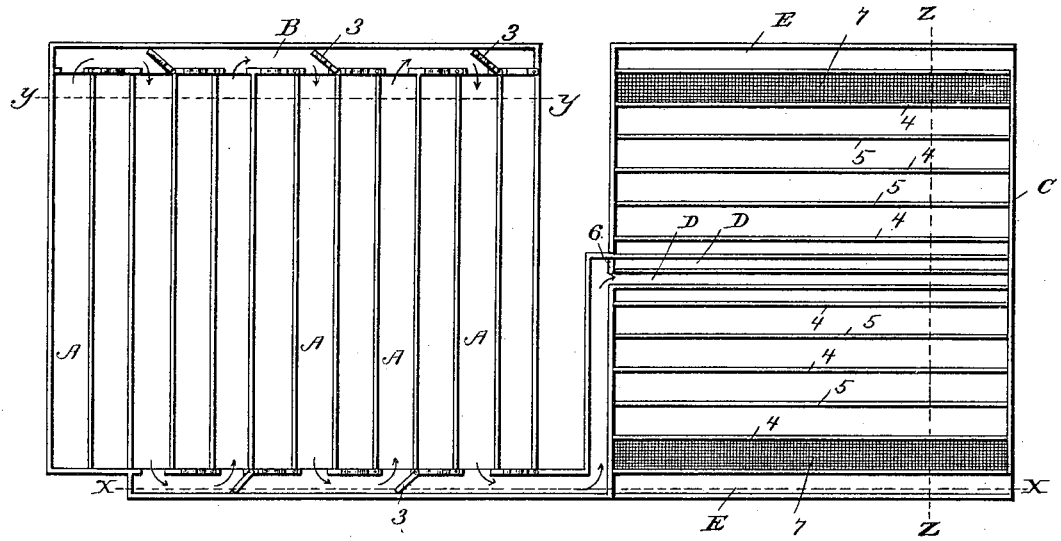

(No Model.)

J. D. COPLEN.
APPARATUS FOR TREATING ORES.

No. 467,158. Patented Jan. 19, 1892.

WITNESSES:
A. S. Randall
Edwin L. Bradford

INVENTOR
J. D. Coplen
BY V. D. Stockbridge
his ATTORNEYS

UNITED STATES PATENT OFFICE.

JOHN D. COPLEN, OF DENVER, COLORADO.

APPARATUS FOR TREATING ORES.

SPECIFICATION forming part of Letters Patent No. 467,158, dated January 19, 1892.

Application filed April 20, 1891. Serial No. 389,661. (No model.)

*To all whom it may concern:*

Be it known that I, JOHN D. COPLEN, a citizen of the United States, residing in the city of Denver, Arapahoe county, Colorado, have invented certain new and useful Improvements in Apparatus for Treating Ores; and I do hereby declare that the following is a full, clear, and exact description of the invention, such as will enable others skilled in the art to which it appertains to practice the same.

My invention relates to a new apparatus for treating and concentrating ores and their slimes, particularly those of the precious metals. Many ores contain substances—such as aluminum, talc, &c.—of a greasy nature, which upon agitation contingent upon pulverization in the presence of water thickens and produces a soapy or creamy mass. In this condition air bubbles formed by the agitation are preserved by a tenacious film for a considerable period of time, and adhering fine particles of ore will float sometimes for miles in and on the water. After a few hours exposure of this mixture of air, water, and fine minerals, which together form acids and gases, the tenacious film is partially decomposed, and by the gravity of the settling pulp the air is liberated and dispelled. The pulp or slime when once settled and deprived of the buoyant bubbles may be treated in gravity-concentrators in well-known ways. Concentration is also facilitated by the grading of the slimes for the same reasons that it is done by grading the heavier granular ores.

Heretofore the usual or known methods of concentrating ores have been to pass the pulp directly from the pulverizers to the concentrators without previous preparation, except in some instances, sizing either with screens or with hydraulic sizers. The difficulty of sizing either with screens or hydraulic sizers is that the slimes or finest floating minerals pass off with the water, and in case of sizing with screens the coarsest sizes retained are not relieved of their greasy substance.

One of the known methods of treating slime after concentration is to conduct the waste matter to a large reservoir or lake, where it is permitted to accumulate, and after the same has settled and the water has been drawn off it is collected and treated in the usual ways. According to this method, aside from the necessity of preparing a large reservoir, the slimes can only be treated at long intervals of time. In other words, besides being expensive, this plan cannot possibly be continuous, and, moreover, there is danger that more or less of the valuable parts will pass with the overflow from the reservoir, and in any event a second concentration will be necessary; but the greater difficulty is in the settling of the slimes with the coarser matter, which precludes the possibility of saving the finer parts or slimes.

Another method practiced to some extent consists in conducting the pulp or slimes, in connection with a stream of water, to a cistern divided into compartments by partitions extending upward from the bottom and allowing the particles to settle in the different compartments, the overflow passing off as waste. This plan has the advantage of being continuous and avoids the necessity of again collecting the slimes; but the floating part is carried off as waste. This plan, however, is attended with the same difficulty as that of the reservoir, in that it has too great a surface to practically admit of sufficient current of the surface waters to carry the lighter parts over the partitions, and hence the finer and lighter parts settle with the coarser, which is fatal to a complete saving of the values by concentration.

The object of my invention is to avoid the difficulties and expense of the former method and the waste of the latter, and to this end my invention consists in an apparatus such as represented in the accompanying drawings, in which—

Figure 2:
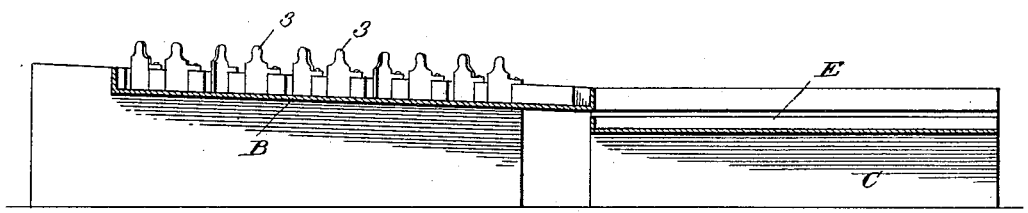
Figure 3:
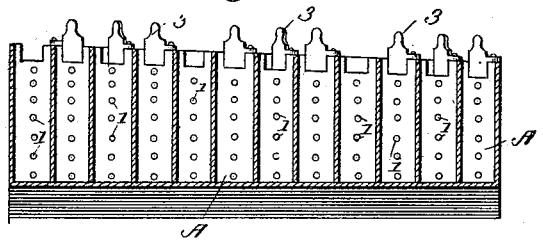
Figure 4:
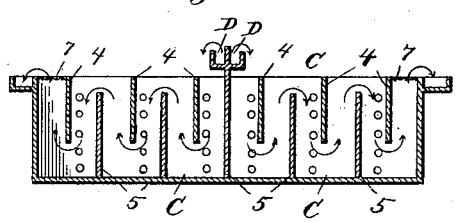
Figure 5:
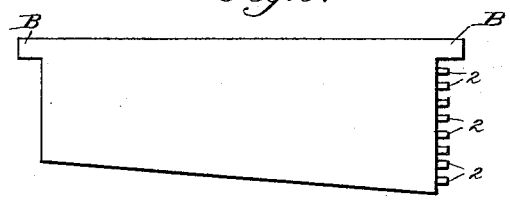

Figure 1 is a top or plan view. Fig. 2 is a sectional view thereof on the line $x\,x$ of Fig. 1. Fig. 3 is a section on the line $y\,y$, showing the gates in the troughs in elevation. Fig. 4 is a section on the line $z\,z$, and Fig. 5 is a side elevation of one of the tanks.

A is a long, deep, and narrow tank having inclined bottom and discharge-ways 1 1 normally closed or plugged by stoppers 2 2. This tank is followed by as many more similar tanks as may be desired. I have illustrated twelve in the drawings as a suitable number for the most complete separation and grading of the pulp. Shallow troughs B B are arranged along and past the upper surface of the ends of the tanks, and lateral openings or ways extend from the troughs to each of the tanks for conveying pulp to and from the surface of said tanks. The troughs and tanks are provided with gates or wings 3 3 for deflecting the stream from trough to tank and from tank to trough, as indicated by the arrows. These deep and narrow tanks are followed by a large broad tank C, having semi-partitions 4 extending from top downward and 5 extending from the bottom upward, alternating with each other. The troughs B discharge their contents into one or the other of troughs D D, according to the arrangement of the gate 6, (shown in Fig. 1,) and troughs D D discharge by lateral overflow into one or the other of the tanks C. The surplus liquid passes down beneath semi-partitions 4 and over partitions 5, and is conducted away to waste or to reservoir through filters or strainers 7 7 and troughs E E.

In order to provide for continuous working, I make the apparatus double—that is to say, I cause the pulp to be fed into one or the other of the first two tanks arranged side by side, and then by adjusting the gates 3 3 direct the current through or over the surface of alternate tanks and alternately into one or the other of the tanks C C, so that one set of tanks may be flushed and their contents discharged to gravity-concentrator while the other set is being filled. The primary tanks are made deep, as described, to provide a still body of water at the bottom, over which the current or stream passes to permit the settling of the values according to gravity and fineness, and they are made narrow to narrow the channel to cause a rapid flow on the surface and with inclined bottoms, in order that they may be readily flushed and contents discharged by a small stream of water. The discharge-orifices 1 1 and plugs 2 2 are provided so that the contents may be drawn or driven off in a regular or constant stream for delivery to the concentrator. The gates 3 3 may be hinged, as shown, or arranged to slide in and out, or to be shifted from one place to another, as may be most convenient. The central troughs D D alternately discharge over their sides into the final settling-tanks C C. These tanks are duplicated to permit of discharging from one while the other is filling, as with the tanks A, and they are provided with perforations and plugs like those in tanks A and for a similar purpose.

In operation the tanks are by preference all filled with water, and then water and pulp are fed to the first tank A, and thence, as indicated by the arrows, to one of the tanks C, and thence beneath partition 4 and over partition 5 up through filter 7, and the surplus water off by trough E. The lighter and finer material is carried forward with the current, the contents of each succeeding tank becoming less dense by reason of the gradual precipitation. This operation causes a fine gradation and classification of the matter, and the final settling of the more intangible (often the richest) particles are secured in the final chamber C, where they are compelled to flow under the pendent partitions, where the pressure serves to compress and expel the air bubbles that buoy up the mineral, and the still finer or impalpable matter which passes these partitions is finally caught by the horizontal filter and the water passes away clear. In some cases these finer slimes are sufficiently rich for treatment without further concentration; but if not sufficiently rich, then each size, as the contents of a tank, should be treated on a gravity-concentrator in the usual way. The discharging should be done by a jet of clear water applied in the shallow end of a tank, and by its currents force the matter through the holes 1 1 as the plugs 2 2 are removed from time to time.

It should be understood that the first tank will receive and hold the coarse parts, and while it is being emptied to screen-sizer, by which coarse matter is sized, the feed is shifted to the second tank, the slime sizes or floats passing on beyond these and are discharged from time to time to gravity-concentrators, as before stated.

Having now described my invention, what I claim is—

1. In an apparatus for treating ores and their slimes, the combination of a series of deep narrow tanks arranged side by side, and shallow troughs or conduits arranged near the surface of and communicating with the ends of said tanks, so as to conduct a surface stream out from one and into another, substantially as described.

2. In apparatus for treating slimes, the combination of a series of deep narrow tanks arranged side by side, shallow troughs or conduits arranged near the surface of and communicating with the ends of said tanks, and gates or chutes for deflecting the surface current from trough to tank, substantially as described.

3. In an apparatus for treating ores and their slimes, the combination of a series of long, deep, and narrow tanks arranged side by side, troughs or channels leading to and from the ends of said tanks near their surfaces, and a final settling tank or reservoir having pendent and standing semi-partitions, substantially as described.

4. In an apparatus for treating ores and their slimes, the combination of a series of long, deep, and narrow settling-tanks, troughs or channels leading to and from the ends of said tanks, and a final settling-tank having pendent and standing semi-partitions and a horizontal filter at the surface through which the waste water is discharged, substantially as scribed.

In testimony whereof I affix my signature in the presence of two witnesses.

JOHN D. COPLEN.

Witnesses:
SANFORD HOAG,
S. J. TOY.